United States Patent [19]

Mancuso et al.

[11] Patent Number: 4,768,992
[45] Date of Patent: Sep. 6, 1988

[54] FLEXIBLE DRIVE COUPLING WITH CONVOLUTED LINKS

[75] Inventors: Jon Mancuso; James H. Paluh, both of Erie, Pa.

[73] Assignee: Zurn Industries, Inc., Erie, Pa.

[21] Appl. No.: 920,428

[22] Filed: Oct. 20, 1986

[51] Int. Cl.$^4$ .............................................. F16D 3/58
[52] U.S. Cl. .......................................... 464/69; 464/81
[58] Field of Search .................. 464/69, 81, 84, 93, 464/98, 99, 100, 101

[56] References Cited

U.S. PATENT DOCUMENTS

| | | | |
|---|---|---|---|
| 1,145,602 | 7/1915 | Lieber | 464/69 |
| 1,360,555 | 11/1920 | MacDonald | 464/99 |
| 1,387,532 | 8/1921 | Dexter | 464/99 |
| 1,466,238 | 8/1923 | MacDonald | 464/69 |
| 1,947,052 | 2/1934 | Lack | 464/99 |
| 2,532,755 | 12/1950 | Bloomfield | 464/69 X |
| 2,580,781 | 1/1952 | Hoffer | 464/69 |
| 3,808,837 | 5/1974 | Anderson et al. | 464/99 |
| 4,019,345 | 4/1977 | Fukuda | 464/69 |
| 4,019,346 | 4/1977 | Fukuda | 464/69 X |
| 4,708,692 | 11/1987 | Weiss | 464/69 |

FOREIGN PATENT DOCUMENTS

| 413483 | 2/1947 | Italy | 464/69 |
|---|---|---|---|
| 0000437 | of 1915 | United Kingdom | 464/69 |

Primary Examiner—Daniel P. Stodola
Attorney, Agent, or Firm—Charles L. Lovercheck; Wayne L. Lovercheck; Dale R. Lovercheck

[57] ABSTRACT

A flexible power transmission coupling wherein a drive member is connected to a driven member by a link assembly. The links are stacked and connected in series. Each link has a first end, a second end and an intermediate part. The first ends of each link are connected together and to the driven member, the second ends of each link are connected together and to a driven member or vice versa. The intermediate part of each link is convoluted and narrower than the ends. This allows greater axial and angular misalignments between drive and driven members. Also this results in a more linear relation between axial force and deflection of the coupling.

14 Claims, 7 Drawing Sheets

FLEXIBLE DRIVE COUPLING WITH CONVOLUTED LINKS

BACKGROUND OF THE INVENTION

This invention relates to flexible couplings which connect one rotatable shaft or other rotating part to another to permit the transmission of torque from one rotating part to the other and to accommodate misalignment of one part to the other. The misalignment may be "angular misalignment" wherein the axes of the two shafts intersect at an angle, and/or "parallel offset" wherein the axes of the two shafts do not intersect at all, and/or "axial movement" wherein the shafts move together or apart along the axes of the shafts.

This invention constitutes an improvement over the couplings shown in U.S. Pat. No. 3,808,837 owned by the assignee of the present application. It also constitutes an improvement over U.S. Pat. No. 2,580,781 to Hoffer, which shows a flexible drive coupling having the drive part and the driven part connected together by non-convoluted links that are pivotally connected together in bunches and connected between the drive member and the driven member at circumferentially and radially spaced positions. The coupling disclosed herein has its links attached to the drive and driven members at a radially equal position.

U.S. Pat. No. 1,145,602 to Lieber shows a flexible coupling with straight sided convoluted links attached to the drive and driven members at constant radial positions.

U.S. Pat. No. 3,808,837 utilizes a plurality of discs having a flexing area which include at least one, but not more than about four, circumferentially extending convolutions. Applicant provides a coupling using a plurality of circumferentially disposed links. Applicant's structure has definite advantages over each of the above references.

SHORT STATEMENT OF THE INVENTION

This invention concerns a flexible coupling having portions adapted for connection to a rotatable driving member and portions adaptable for connection to a rotatable driven member. The drive and driven members are connected together by a plurality of convoluted leaf elements with intermediate parts narrower than end parts and of specific properties arranged in stacks and connected together by bushings. The bushings are alternately connected to the drive member and to the driven member at circumferentially spaced positions. The links or leafs are made of thin convoluted material, the end of which rests in two generally parallel planes. The links between the ends are convoluted in sinusoidal manner. The convolutions and reduced intermediate part give the coupling additional flexibility and linear axial stiffness.

The present link invention displays the following coupling characteristics and design advantages

A. SHAPE
1. Flexibility: testing has shown up to a 2X variation in axial travel and misalignment capacities depending on convolutions and shape.
2. Torsional Stiffness: transmits torque loads without flattening link.
3. Lateral Stiffness: allows rotation without producing lateral vibrations.
4. Linearity: linear axial stiffness over a design range allowing accurate calculations of axial natural frequencies.
5. Ratios: the geometric ratios as described herein must be used to produce the desired characteristics.

B. MATERIAL
1. Spring Type: allows transmission of higher torques with no plastic deformation and greater misalignment capability due to high endurance strength.
2. Coating: to minimize the effect of bolt tightening torques and the effect of fretting from bolt clamping variations.

C. ASSEMBLY
1. Overlap: allows the use of fewer pieces as washers are not necessary to separate links which prevents contact between flexure points and thus surface damage is avoided.
2. Wrap Around Chain Pack: allows replacement of flex elements in restricted areas without movement of equipment. See FIG. 1.
3. Unitized Pack: allows total replacement of link pack and reduces the number of parts that must be installed. See FIG. 2.

It is an object of the invention to provide an improved flexible coupling.

Another object of the invention is to provide a flexible coupling wherein the drive and driven coupling members are connected by rows of convoluted links with ends disposed in spaced parallel planes to one another.

Another object of the invention is to provide a flexible coupling that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figures 1, 1A:
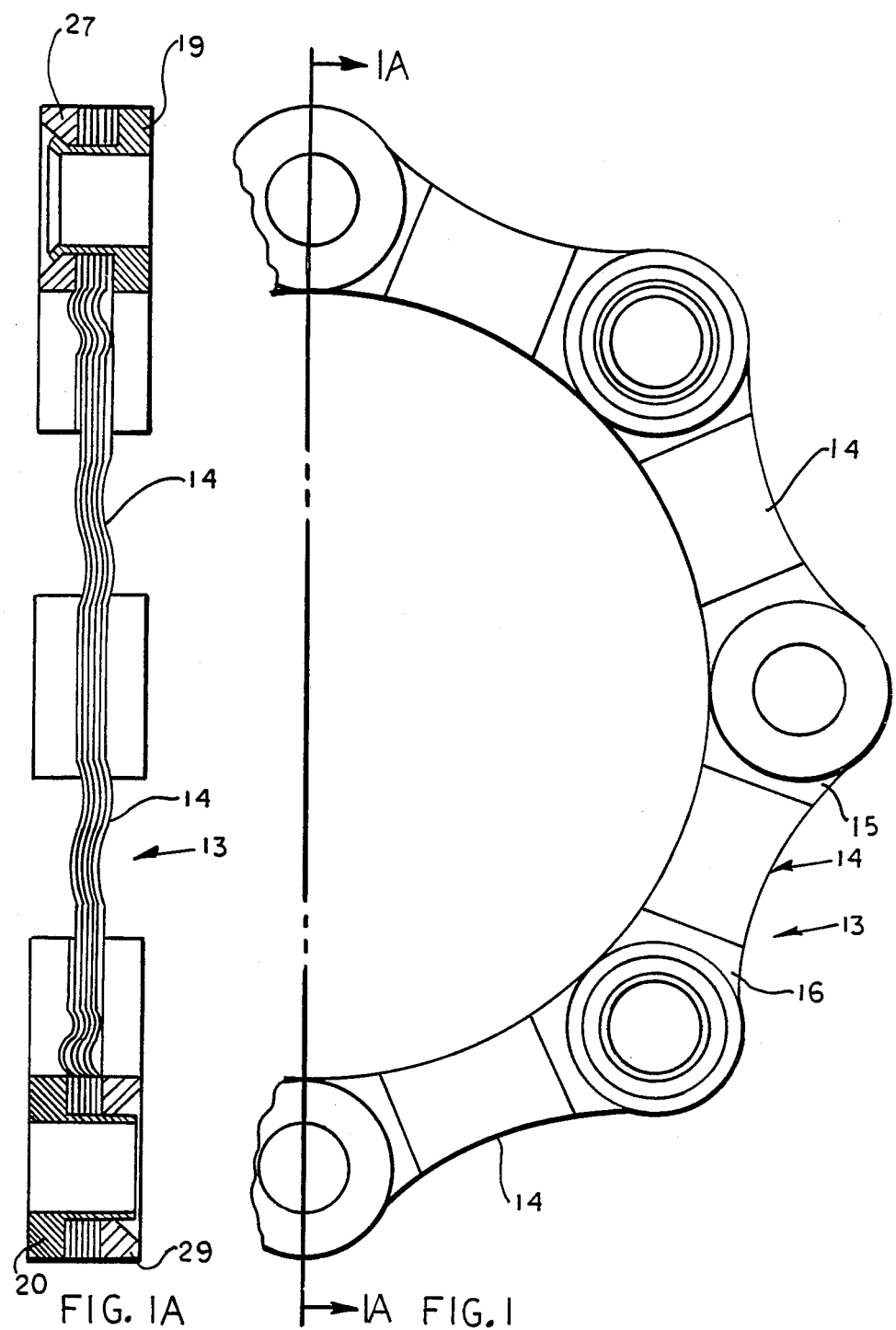
FIG. 1 is a side view of the wrap around chain pack.
FIG. 1A is a cross sectional view taken on line 1A—1A of FIG. 1 of the wrap around chain pack.
Figure 2A:
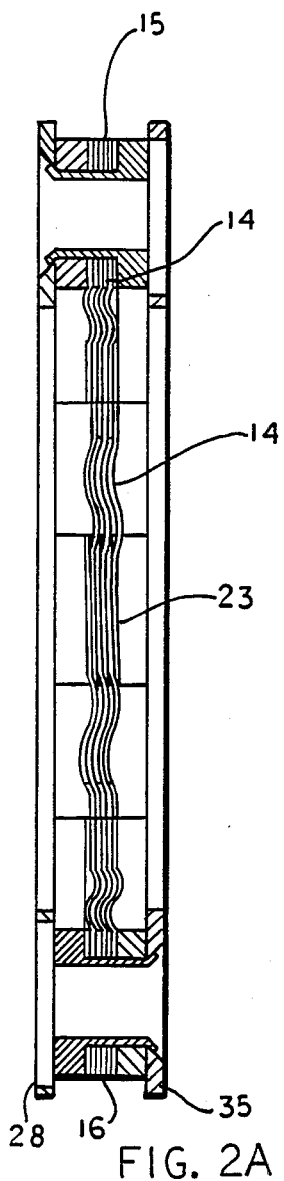
FIG. 2A is a cross-sectional view taken on line 2A—2A of FIG. 2, of an embodiment of the invention with the unitized pack.
Figure 2:
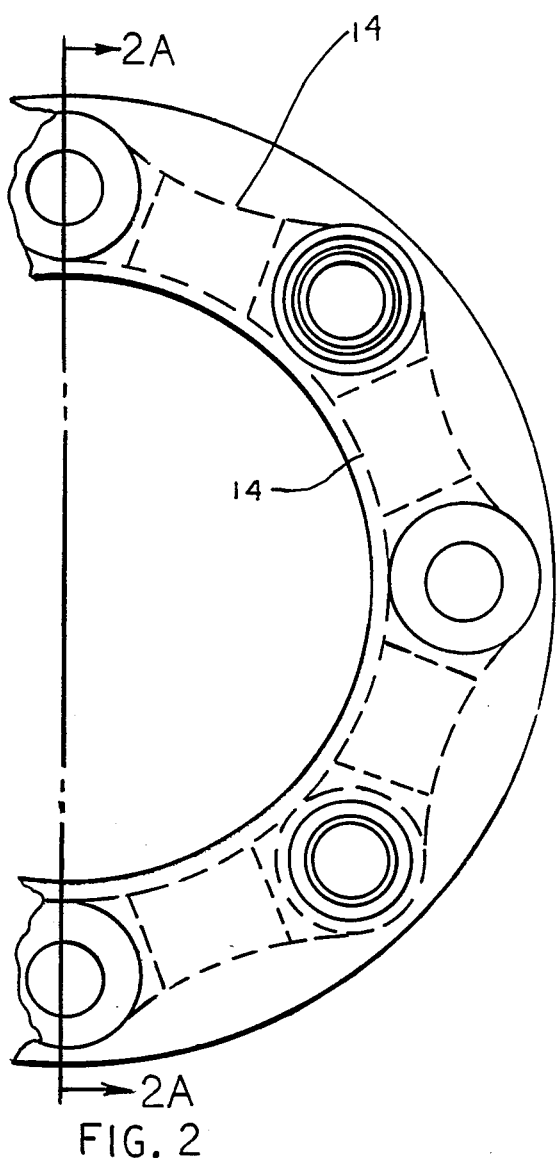
FIG. 2 is a side view of the unitized pack; a coupling of an embodiment of the invention with the unitized pack.
Figure 3:
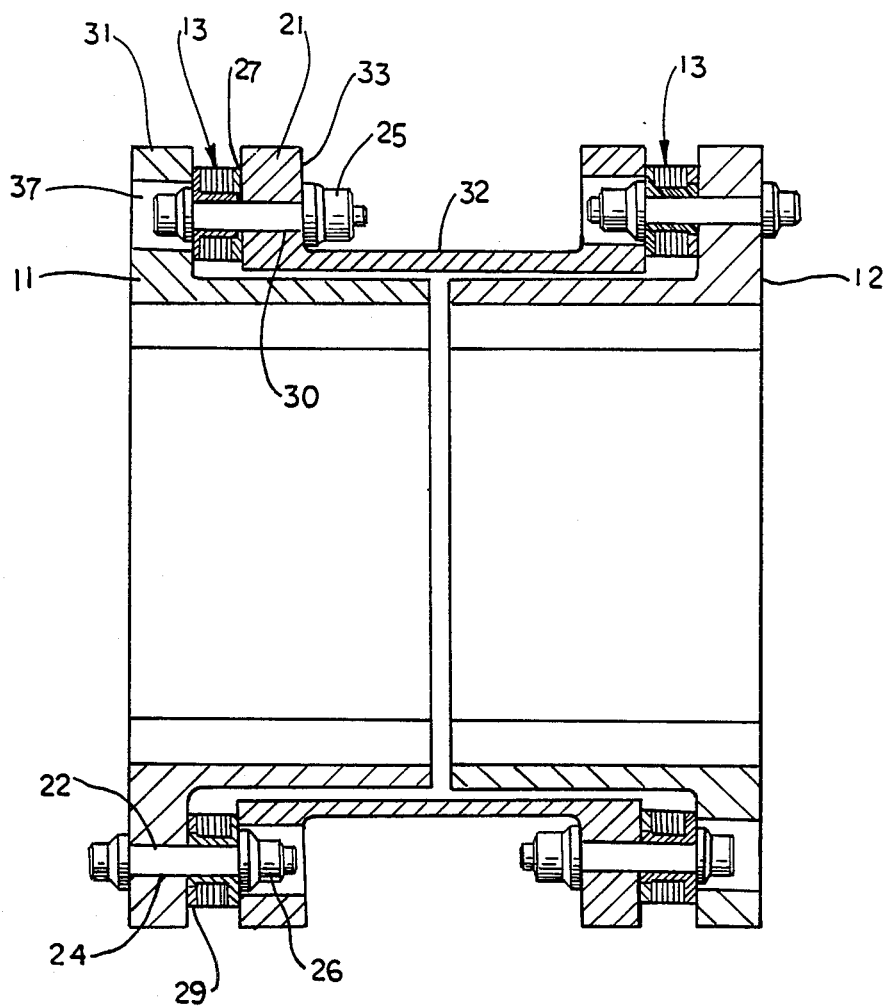
FIG. 3 is a side view partly in cross-section of the assembly of links used in the coupling according to the invention with the wrap around chain pack.

The preferred embodiments of the present invention are illustrated by way of example in FIGS. 1 through 10. With specific reference to FIG. 3, I show a power coupling, made in accordance with this invention, comprising a first coupling half 11, which may be a drive member and a second coupling half 12 which may be a driven member. A link assembly 13, as shown in FIG. 3, made up of a plurality of convoluted links 14, each link being made of relatively thin spring steel material having a first end 15, a second end 16 and an intermediate part 17, as shown in FIGS. 5, 6, 7 and 8.

Figure 6:
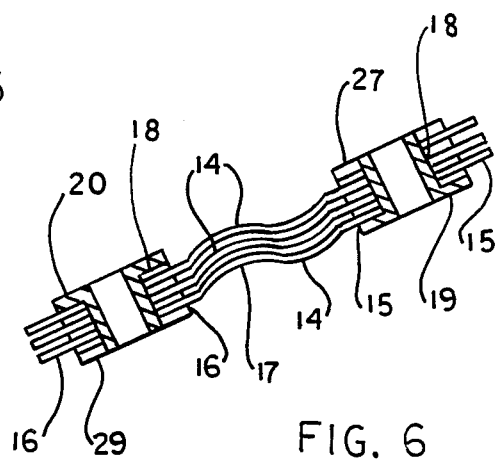
FIG. 6 is a cross sectional view taken on line 6—6 of FIG. 5.

The link assembly 13 may be assembled with the links 14 held together by the bushings 19 and the bushings 20 in the holes 18 at the ends 15 and 16 of links 14 as shown in FIGS. 1, 1A and 6. The ends of the bushings can be pressed into washers 27 and 29 as shown in FIGS. 1 and 1A or endplates 28 and 35 as shown in FIGS. 2 and 2A.

Figure 7:
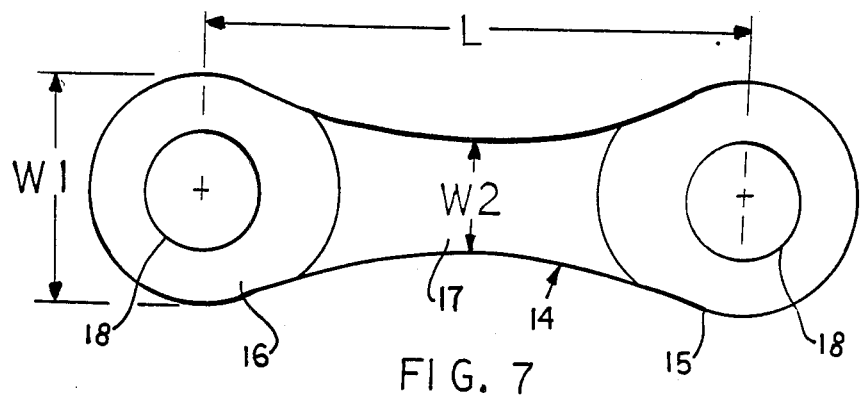
FIG. 7 is a top view of a link according to the invention showing the critical parts.
Figure 8:
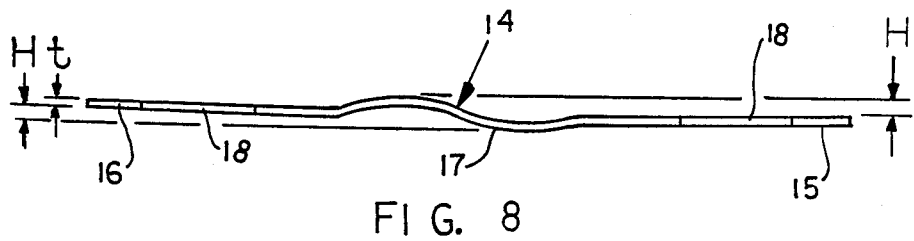
FIG. 8 is a side view of a link according to the invention.

The links 14 may be made of any suitable thickness, depending on the particular application, but they may vary in thickness from a few thousandths of an inch thick up to, for example, 0.0625 inch or thicker. As shown in FIGS. 7 and 8, the links 14 have thickness T, length between hole centers L, end width W1, reduced overall width W2, and an offset of convolutions H. The links 14 are formed having the ratios of $W1/W2=1.2-2.7$; $L/W1=2.0-4.0$; $T/W1=0.03-0.07$ and $H/L=0.01-0.03$.

Figure 5:
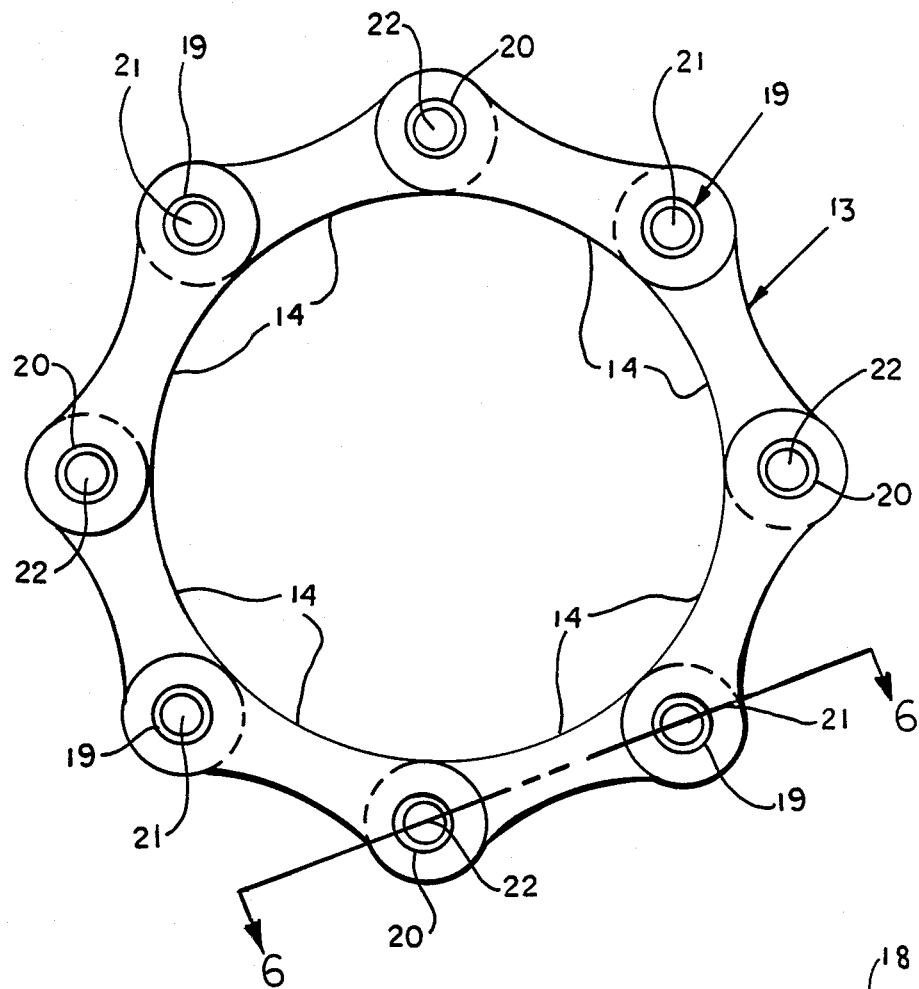
FIG. 5 is a front view of one of the link assemblies of the embodiment shown in FIG. 6.

In each case, the ends 15 and 16 are each disposed in a plane spaced from and parallel to the other. The ends 15 and 16 of the links 14 are wider than the reduced width intermediate part 17. The reduced intermediate part 17 of the links 14 gives the coupling greater flexibility as it moves the flexure point away from the ends of the link 14. The first ends 15 and second ends 16 are wide and sufficiently strong to hold the ends of the link 14 to the coupling member. The first end 15 and second end 16 of each link 14 have a hole 18 therein. The intermediate part 17 of each link 14 between its ends are convoluted. The first end 15 and second end 16 of the link 14 are rounded as shown in FIGS. 5 and 7, so that they will overlap the other links. The first end 15 of each link 14 overlies a first end 15 of a link 14 adjacent thereto in each bundle with the holes 18 of the links 14 aligned with each other. The entire links are coated with an anti-friction material.

Figure 4:
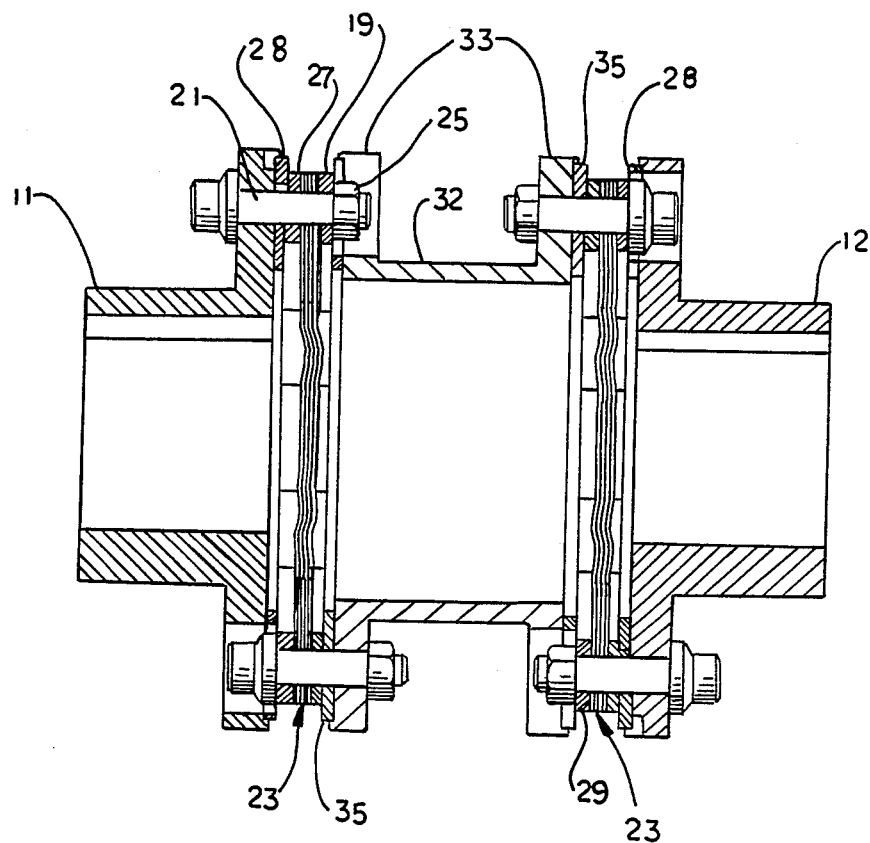
FIG. 4 is a longitudinal cross-sectional view of another embodiment of the invention using the unitized pack.

First bushing 19 is pressed into and extends through the hole 18 in the first ends 15 and second bushing 20 is pressed into and extends through holes 18 in the second ends 16 of the links. These bushings receive bolts 21 and 22 that fasten a first end 15 of the link 14 to the spacer 32 and a second end 16 of the link 14 to a drive member 11, as shown in FIGS. 3 and 4, thereby providing a flexible joint between them. This procedure is repeated for the driven end 12.

In the first embodiment of the invention of FIG. 3, I show a drive member 11 that has a radially extending flange 31 and an axially extending tube part which may be bored to receive a driving shaft which may be connected to the tube in a well known manner. The flange 31 has circumferentially spaced large holes 37 which receive the heads of the bolts 21. Small holes 24 are disposed between large holes 37 and receive part of the body of bolt 22. The bolt 21 extends through the bushings 19 in the first ends 15 of the links 14. The bolt 22 extends through the bushings 20 in the second ends 16 of the links 14. The nuts 25 on bolt 21 clamp the first ends 15 between the washer 27 and the spacer flange 33. The second ends 16 of the links 14 are clamped between washer 29 and flange 31. The nuts 25 on bolt 21 rest on the outer surface of the radial flange 33. The heads of bolts 21 rest on washer 27 or bushing 19.

The heads of bolts 21 are received in the large holes 37 in the drive member 11 and extend through the first ends 15 of the links 14, through the first washer 27 and the bushing 19 and through the small hole 30 in the spacer flange 33 and clamp the first ends of the links to the spacer 32. The second bolt 22 extends through a small hole 24 in the flange 31 and its head overlies the flange 31. The bolts 22 extend through the bushings 20 and washer 29 and has a nut 26 on its end that clamps the second ends 16 of the link 14 to drive flange 31. The procedure is repeated for the driven end 12.

In the embodiment of the invention shown in FIG. 4, the drive member 11 and driven member 12 have their sleeves turned outward. The unitized pack 23 like FIG. 2 is used. The nuts 25 on bolts 21 clamp the first ends 15 of the links 14 between the washer 27 and the endplate 28. The second ends 16 of the links 14 are clamped between the washer 29 and the end plate 35. The endplates 28 pilot the link packs 23 to the drive member 11 and driven member 12. The endplates 35 pilot the link pack 23 to the spacer flanges 33.

Figure 9:
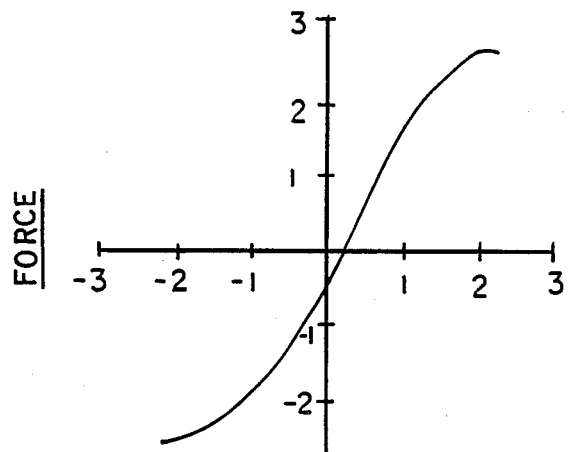
FIG. 9 is a graph showing deflection versus axial force of a straight sided link; and, FIG. 10 is a graph of deflection versus axial force of a convoluted link with thinned intermediate part according to the invention.

FIG. 9 shows a graph of deflection versus axial load force of a straight sided link showing a non-linear relationship.

Figure 10:
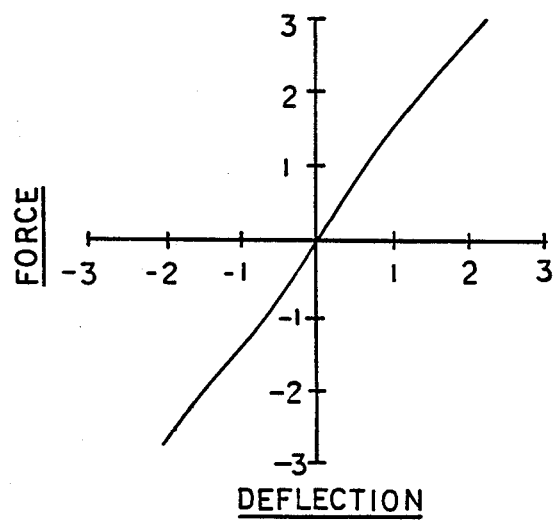

FIG. 10 shows a graph of deflection versus load force of a convoluted link with thin intermediate part according to the invention showing a linear relationship of deflection to force over the range of force for which the coupling is designed.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A flexible connecting member for connecting a drive member to a driven member to form a flexible coupling comprising:
   a plurality of link assemblies connected together to form a continuous chain,
   each said link assembly comprising a plurality of relatively thin flat links,
   each said link being convoluted in a substantially sinusodial shape and nested with all of the other said links in said assembly,
   said links each having a first end, a second end and an intermediate part,
   said intermediate part of each said link being narrower than said end parts of said links, a first hole in each said first end and a second hole in each said second end, each said first end of each said link in a particular assembly being interleaved between said first ends of said links of a link assembly adjacent thereto, each said second end of each link of said particular assembly being interleaved between said second end of said links of a particular assembly adjacent thereto, each said first holes in said links of each said particular link assembly and said first holes in said link assembly adjacent thereto having a first bushing pressed into said first holes, each of said second holes in each said links of each particular said link assembly and said second holes in said link assembly adjacent thereto having a second bushing pressed into them whereby said link assemblies are held in said continuous chain, said first bushings each being adapted to receive a first attaching means for attaching said first end of each said link assembly to a said drive member, each said second bushing being adapted to receive a second attaching means for attaching said second ends of said link assemblies to said driven member, said first attaching means being adapted to exert a force on said drive member and said first ends of said links whereby said first ends of said first links and said first ends of said second links are clamped between said first attaching means and said drive member, said second attaching means being adapted to exert a force on said driven member and said second ends of said links whereby said second ends of said first links and said second ends of said second links are clamped between said second attaching means and said driven member, whereby a said drive member and a said driven member are connected together and can rotate in misalignment with one another.

2. The flexible connecting member recited in claim 1 wherein said bushings engage the surfaces of said links around said holes.

3. The flexible connecting member recited in claim 1 wherein said links are further comprised of spring steel material.

4. The flexible connecting member recited in claim 1 wherein first bolts having a first end having first means for fastening overlying said first flange, clamping said second end of each said stack link to said first flange, said second bolts having said second means for fastening overlying said second flange, clamping said first end of each said stack of links to said second flange.

5. The flexible connecting member recited in claim 1 wherein said links each have rounded ends and edges conforming to the arc of a circle.

6. The flexible connecting member recited in claim 1 wherein the sides of said links are convoluted conforming to a sinusoidal shape.

7. The coupling recited in claim 1 wherein said links having a major width (W1) at each said end,
said links having a minor width (W2) and a length (L) between the center lines of said holes and said major width (W1) being greater than said minor width (W2).

8. A coupling comprising a drive member and a driven member and a flexible member adapted to allow misalignment between said drive member and said driven member forming a flexible coupling comprising, a plurality of link assemblies connected together to form a continuous chain, each said link assembly comprising a plurality of relatively thin flat links, each said link being convoluted in a substantially sinusodial shape and nested with all of the other said links in said assembly, said links each having a first end, a second end and an intermediate part, said intermediate part of each said link being narrower than said end parts of said links, a first hole in each said first end and a second hole in each said second end, each said first end of each said link in a particular assembly interleaved between said first ends of said links of said particular link assembly adjacent thereto, each said second end of each link particular said link assembly being interleaved between said second ends of said links of said particular link assembly adjacent thereto, each said first holes in said links of each particular said link assembly and said first holes in said link assembly adjacent thereto having a first bushing pressed into said first holes.

each of said second holes in said links of each particular said link assembly and said second holes in said particular link assembly adjacent thereto having a second bushing pressed into them whereby said link assemblies are held in said continuous chain, said first bushings each receiving a first fastening means attaching said first end of each said link assembly to a said drive member, each of said second bushings receiving a second attaching means attaching said second end of said links in a particular said link assembly to said driven member, said first attaching means being adapted to exert a force on said drive member and said first ends of said links whereby said first ends of said first links and said first ends of said second links are clamped between said first attaching means and said drive member, said second attaching means being adapted to exert a force on said driven member and said second ends of said links whereby said second ends of said first links and said second ends of said second links are clamped between said second attaching means and said driven member, whereby said drive member can drive said driven member for rotation in a misaligned relation to one another.

9. The coupling recited in claim 8 wherein the ratio of the major width (W1) of the links to the minor width (W2) at the center of links is between 1.2 and 2.7.

10. The coupling recited in claim 8 wherein the ratio of the link thickness (t) to its major width W1) is between 0.03 and 0.07.

11. The coupling recited in claim 8 wherein said convoluted links are generally sinusoidal and having crests and ratio of the convolution offset (H) to the center distance (L) of the holes (18) is 0.01 to 0.03.

12. The coupling recited in claim 8 wherein said bushings have washers received on the second end thereof, and said washers are clamped by said clamping means against said drive member and against said driven member.

13. The coupling recited in claim 8 wherein each said link is coated with a low friction material whereby the coefficient of friction of said links is reduced.

14. The coupling recited in claim 8 wherein said said major width (W1) is greater than said minor width (W2) by a ratio of 1.2 to 2.7, the ratio of said length to said major width (W1) of each of said links is between 2.0 and 4.0 whereby said coupling has linear axial stiffness and said drive member (11) and said driven member (12) can operate out of axial and out of angular alignment relative to each other.

* * * * *